United States Patent
Sinha et al.

(10) Patent No.: US 10,457,875 B2
(45) Date of Patent: Oct. 29, 2019

(54) H2 AND BIO-FUELS PRODUCTION FROM RENEWABLE FEEDSTOCKS

(71) Applicant: Council of Scientific & Industrial Research, New Delhi (IN)

(72) Inventors: Anil Kumar Sinha, Uttarakhand (IN); Mohit Anand, Uttarakhand (IN); Saleem Akthar Farooqui, Uttarakhand (IN); Rakesh Kumar, Uttarakhand (IN); Rakesh Kumar Joshi, Uttarakhand (IN); Rohit Kumar, Uttarakhand (IN); Aditya Rai, Uttarakhand (IN)

(73) Assignee: COUNCIL OF SCIENTIFIC & INDUSTRIAL RESEARCH (IN)

(*) Notice: Subject to any disclaimer, the term of this patent is extended or adjusted under 35 U.S.C. 154(b) by 48 days.

(21) Appl. No.: 15/645,629

(22) Filed: Jul. 10, 2017

(65) Prior Publication Data

US 2018/0010052 A1    Jan. 11, 2018

(30) Foreign Application Priority Data

Jul. 11, 2016  (IN)  ............................. 201611023588

(51) Int. Cl.
*C10G 3/00* (2006.01)
*C01B 3/22* (2006.01)

(52) U.S. Cl.
CPC .................. *C10G 3/46* (2013.01); *C01B 3/22* (2013.01); *C10G 3/48* (2013.01); *C10G 3/50* (2013.01);
(Continued)

(58) Field of Classification Search
CPC .. Y02P 30/20; C10G 3/50; C10G 3/47; C10G 3/45; C10G 3/46; C10G 3/48;
(Continued)

(56) References Cited

U.S. PATENT DOCUMENTS 2,163,563 A   6/1939  Walther
4,300,009 A   11/1981 Haag et al.
(Continued)

FOREIGN PATENT DOCUMENTS

IN   2622/DEL/2014   4/2014
IN   3039/DEL/2012   4/2014
(Continued)

OTHER PUBLICATIONS

Liu et al. "Hydrotreatment of Jatropha oil over NiMoLa/Al2O3 catalyst" Green Chem., 2012, 14, 2499-2505 (Year: 2012).*

*Primary Examiner* — Amber R Orlando
*Assistant Examiner* — Syed T Iqbal
(74) *Attorney, Agent, or Firm* — Belles Katz LLC

(57) ABSTRACT

The present invention discloses a catalytic process for the manufacture of hydrogen and hydrocarbons simultaneously in the same reactor from renewable source, i.e. lipids, glycerides and fatty acids from plant, animal or algae oil, where in the multiple unsaturations in the renewable feedstock and the catalytic intermediates produced in the process from renewable feedstock is converted catalytically using simultaneous combination of in-situ occurring reactions. These in-situ occurring reactions are simultaneous combination of hydroconversion, reforming and water gas shift reactions wherein the reaction is performed in the presence of one or more metal sulfides form of metals of Group VI and/or Group IX and/or Group X elements, specifically comprises of one or more active metal combinations such as Co, W, Mo, Ni, P, with Pt, Pd encapsulated inside sodalite cages for prevention against poisoning from sulfur based compounds. The hydroconversion comprises of reactions in presence of hydrogen such as hydrocracking, dehydrogenation, dehydrocyclization, hydrodeoxygenation, hydrodesul- (Continued)

furization, hydrodenitrogenation, decarboxylation, decarbonylation, cyclization and aromatization reactions. The catalyst along with the active metals also includes porous silica-alumina, zeolite, silica, alumina, silicoaluminophosphates or a combination of two or more thereof used as support for the above said process. These catalysts are loaded in a graded beds (two or more beds of different catalyst mixtures) or simultaneously (mixture of different catalyst systems) and reacted specifically at lower temperatures than the steam reforming conditions i.e. at pressure from 10 to 150 atmosphere, average temperature of the catalytic bed from 250° C. to 500° C., space-velocity of from 0.5 $h^{-1}$ to 8 $h^{-1}$, and hydrogen to feed ratio of from 300 NL of hydrogen/L of feed to 3500 NL hydrogen/L of feed. Initially hydrogen gas is supplied for conversion of the renewable feed stocks, as the reaction process the hydrogen consumed during the conversion of plant, animal or algae oil into hydrocarbons is balanced from the in-situ reactions such as reforming, dehydrogenation, water gas shift etc occurring during the same process. This production of hydrogen makes the entire process refinery independent and more economical and sustainable. Along with hydrogen the renewable feed stock is also converted into hydrocarbons ranging between C1-C24 carbon number, comprising of n-paraffins, isoparaffins, cyclo paraffins, naphthenes, and aromatics and polynuclear aromatics.

7 Claims, 2 Drawing Sheets

(52) U.S. Cl.
CPC ............... *C01B 2203/0277* (2013.01); *C01B 2203/1052* (2013.01); *C01B 2203/1058* (2013.01); *C01B 2203/1064* (2013.01); *C01B 2203/1211* (2013.01); *C10G 2300/1011* (2013.01); *C10G 2300/202* (2013.01); *Y02P 30/20* (2015.11)

(58) Field of Classification Search
CPC ........ C10G 2300/4081; C10G 2400/04; C10G 2300/1018; C10G 2300/1014; C10G 2300/1037; C10G 2300/1011; C10G 2300/202; C01B 3/22; C01B 2203/0277; C01B 2203/1058; C01B 2203/1211
See application file for complete search history.

(56) References Cited

U.S. PATENT DOCUMENTS

| | | | |
|---|---|---|---|
| 4,992,605 A | 2/1991 | Craig et al. | |
| 5,705,722 A | 1/1998 | Monnier et al. | |
| 7,459,597 B2 | 12/2008 | Koivusalmi et al. | |
| 7,491,858 B2 | 2/2009 | Murzin et al. | |
| 7,960,598 B2 | 6/2011 | Spilker et al. | |
| 8,147,766 B2 | 4/2012 | Spilker et al. | |
| 2004/0230085 A1* | 11/2004 | Jakkula | C10G 3/45 585/240 |

FOREIGN PATENT DOCUMENTS

| | | |
|---|---|---|
| IN | 3441/DEL/2012 | 8/2014 |
| WO | 2008054442 | 5/2008 |
| WO | 2009039000 | 3/2009 |
| WO | 2009039335 | 3/2009 |
| WO | 2009039347 | 3/2009 |
| WO | 2014049621 | 4/2014 |
| WO | 2016038633 | 3/2016 |

* cited by examiner

H2 AND BIO-FUELS PRODUCTION FROM RENEWABLE FEEDSTOCKS

CROSS-REFERENCE TO RELATED APPLICATIONS

This application claims the benefit under 35 U.S.C. § 119(a) of Indian Patent Application No. 201611023588, filed Jul. 11, 2016. The disclosure of the above application is incorporated herein by reference.

FIELD OF THE INVENTION

This invention falls within the processing field of conversion of renewable feed stocks, more specifically, lipids, glycerides, and fatty acids of renewable sources waste animal fats and used cooking oils directly into petrochemical (aromatics rich) feedstock pool along with hydrocarbon based fuels ranging from C1-C24 carbon atoms using a catalytic process. Hydrogen is mixed along with the feedstock and then passed into a reactor where the feedstock is hydrodeoxygenated, hydrocracked, hydrotreated, hydroisomerized, hydrogenated, aromatized and cyclized in a single reactor, in a single or multiple catalysts beds, using single or multiple catalytic systems.

BACKGROUND OF THE INVENTION

Increased demand for cleaner fuel due to environmental concern and depleting petroleum reserves in the world coupled with deteriorating quality of the crude oil have led a surge of research for renewable and clean fuel sources. One of the renewable sources may be the oil originating from vegetables and animals such as waste restaurant oil, soyabean oil, jatropha oil, and algae oil etc. This also helps in rural development by providing better cost for their products. But these oils originating from vegetables and animals cannot be used directly in the engine or in the petrochemical complexes as feed stocks, due to the problems inherent with these oils such as higher viscosity and oxygen content and poor atomization and lubricity. Therefore before using in the engine or in the petrochemical complexes these oils are to be converted into bio-diesel or green diesel or aromatic rich feed stocks. Bio-diesel which is Fatty Acid Methyl Esters (FAME) is produced by trans-esterification of fatty acids in triglycerides. To use bio-diesel in the engine requires some modification and additional disadvantages are poor performance in cold weather and poor emission. One way of effectively using these renewable oils is by converting these oils into hydrocarbons with much higher cetane value than conventional diesel fuel, another way is by converting these oils to aromatic rich feedstock along with cracked, isomerized, cyclized products which would be even more valuable than the diesel range hydrocarbons. This process involves conversion of glycerides and fatty acids in renewable oils into C1-C24 hydrocarbon compounds and requires $H_2$ gas as an input gas. Hydrogen is consumed during the process due to hydrodeoxygenation, decarbonylation, decarboxylation, isomerisation, hydrocracking reactions. The consumption of hydrogen gas during the process makes the process difficult to be operated in a standalone operation mode and requires an additional $H_2$ source from refineries for conversion of these oils. This additional requirement of hydrogen makes the process economically less attractive and increases the dependence of this developed technology on refineries or at places where there are existing $H_2$ production facilities.

The patented literature presents some documents in the hydrogenation of vegetable oil, and some for producing hydrogen from triglycerides using steam reforming at extensively high temperatures 550° C. and above but these documents do not consider in their scope the intended process, methods and systems described by this invention.

U.S. Pat. No. 8,147,766 B2 and U.S. Pat. No. 7,960,598 B2 discloses in one embodiment of the invention a steam reforming unit for processing biomass derived oil specifically triglycerides by steam-reforming to yield bio-derived $H_2$. The patent document also discloses co-reforming a portion of the monoesters with the triglycerides sequentially in the same unit or in parallel in a different unit. The steam-reforming reactions occur at very high temperatures between 550° C.-880° C. as explained in the detailed description section of the disclosed invention (Column 6, lines 12-14). These extremely high temperatures lead to catalyst deactivation and need catalyst regeneration for maintaining catalyst activity.

U.S. Pat. No. 2,163,563 discloses the hydrogenation of vegetable oils combined with mineral oil over a reduced Ni catalyst supported in alumina in the presence of hydrogen at high pressure [5 MPa to 50.6 MPa (50 to 500 atmospheres)]. However, this patent does not involve hydrotreatment of a combined load of petroleum and vegetable oils through an HDT process. U.S. Pat. No. 4,300,009 describes a process for generating the product having the boiling point at the range of gasoline boiling point range. This process involves catalytic conversion of anabolites (substances formed in the anabolic process) as resins, vegetable oils and fats in liquid hydrocarbons over zeolites with an effective pore size bigger than 5 Angstrom. U.S. Pat. No. 5,705,722 describes a process to produce additives for diesel fuel which have higher cetane number and may improve ignition of the fuel. The process involves hydroprocessing of the biomass, containing a high proportion of unsaturated fatty acids, wood oils, animal fats and other mixtures in the presence of hydrogen over catalyst. This mixture is then separated and fractioned to obtain a hydrocarbon product with boiling point at the range of diesel's boiling point, being this product the additive with a high cetane number. However the addition of a petroleum hydrocarbon to the biomass load which is being hydroprocessed is not mentioned within this document.

U.S. Pat. No. 4,992,605 describes a process to obtain a stream with a high cetane number to be added to the diesel in the refinery. The process involves hydroprocessing of vegetable oils such as canola or sunflower oil, palm and wood oil that is a waste product from the wood pulp industry, to produce hydrocarbon products in the diesel boiling range by using sulfided catalyst (NiMo and CoMo) in the presence of hydrogen (pressure of 4 to 15 MPa) and temperature in the range of 350° C. to 450° C. This patent does not consider a mixture of a hydrocarbon with vegetable oil in the hydrorefining.

U.S. Pat. Nos. 7,491,858, 7,459,597 B2 describe production of diesel fuel from vegetable and animal oils and also the further isomerization of obtained hydrocarbons using catalysts known in the prior art. Patent WO2008054442 describes a process for converting triglycerides to hydrocarbons. U.S. Pat. No. 4,300,009 describe the production of hydrocarbons such as gasoline and chemicals such as para-xylene from plant oils such as corn oil by using of crystalline aluminosilicate zeolites. US 2004/0230085 A1 discloses a process for treating a hydrocarbon component of biological origin by hydrodeoxygenation followed by isomerization.

WO 2009/039000, WO 2009/039335, WO/2009/039347 describe a process which comprises one or more steps to hydrogenate, decarboxylate, decarbonylate, (and/or hydrodeoxygenate) and isomerize the renewable feedstock, the consumption of hydrogen in the deoxygenation reaction zone is reduced by using at least one sulfur containing component which also operates to maintain the catalyst in a sulfided state.

Our other patent application numbers 3039/DEL/2012, WO 2014/049621, 3441/DEL/2012, 2622/DEL/2014 disclose formation of biofuels and aromatics from lipids, but these inventions do not disclose the production of hydrogen along with hydrocarbons.

In spite of these developments, there is no evidence in literature for low temperature (250-500° C.) hydrogen production along with hydrocarbons from glycerides catalytically using simultaneous combination of hydroconversion, reforming and water gas shift reactions. There is a need for development of a catalyst and process which can be economical and can be operated on a standalone basis for the conversion of glycerides and fatty acids from plant, animal or algae oil without any overall hydrogen requirement for the process.

OBJECTIVES OF THE INVENTION

The objective of the present invention is to develop a low temperature (250-500° C.) single reactor catalytic process for hydrogen production along with hydrocarbons ranging between C1-C24 from lipids, glycerides and fatty acids from plant, animal or algae oil using a single or multiple or mixtures of catalysts beds along with single or multiple catalytic systems by processing these oil specifically at low temperature, 250-500° C. than those for steam methane/naphtha reforming conditions (550° C. or above) to convert the renewable source into hydrogen gas and hydrocarbon product, so that the entire process for the conversion of lipids from various origins is less dependent on refinery hydrogen for operation and can be setup at rural and agricultural areas's on a stand alone basis near the site of production of these renewable oils, with minimal initial requirement of hydrogen gas at a minimal investment.

SUMMARY OF THE INVENTION

The present invention relates to a single reactor catalytic process for the manufacture of hydrogen and hydrocarbons simultaneously in the same reactor from renewable source, i.e. lipids, glycerides and fatty acids from plant, animal or algae oil. These renewable source are catalytically converted using simultaneous combination of hydroconversion, reforming and water gas shift reactions wherein the reaction is performed in the presence of one or more metal sulfides form of metals of Group VI and/or Group IX and/or Group X elements, specifically comprises of one or more active metal combinations such as Co, W, Mo, Ni, P, with Pt, Pd encapsulated inside sodalite cages for prevention against poisoning from sulfur based compounds. The catalyst along with the active metals also includes porous silica-alumina, zeolite, silica, alumina, silicoaluminophosphates or a combination of two or more thereof used as support for the above said process. These catalysts are loaded in a graded beds (two or more beds of different catalyst mixtures) or simultaneously (mixture of different catalyst systems) and reacted specifically at lower temperatures than the steam reforming conditions i.e. at pressure from 10 to 150 atmosphere, average temperature of the catalytic bed from 250° C. to 500° C., space-velocity of from 0.5 $h^{-1}$ to 8 $h^{-1}$, and hydrogen to feed ratio of from 300 NL of hydrogen/L of feed to 3500 NL hydrogen/L of feed. Initially hydrogen gas is supplied for conversion of the renewable feed stocks, as the reaction process the hydrogen consumed during the conversion of plant, animal or algae oil into hydrocarbons is balanced from the in-situ reactions such as reforming, dehydrogenation, water gas shift etc occurring during the same process. This production of hydrogen makes the entire process refinery independent and more economical and sustainable. Along with hydrogen the renewable feed stock is also converted into hydrocarbons ranging between C1-C24 carbon number, comprising of n-paraffins, isoparaffins, cyclo paraffins, naphthenes, and aromatics and polynuclear aromatics.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE INVENTION

Figure 1:
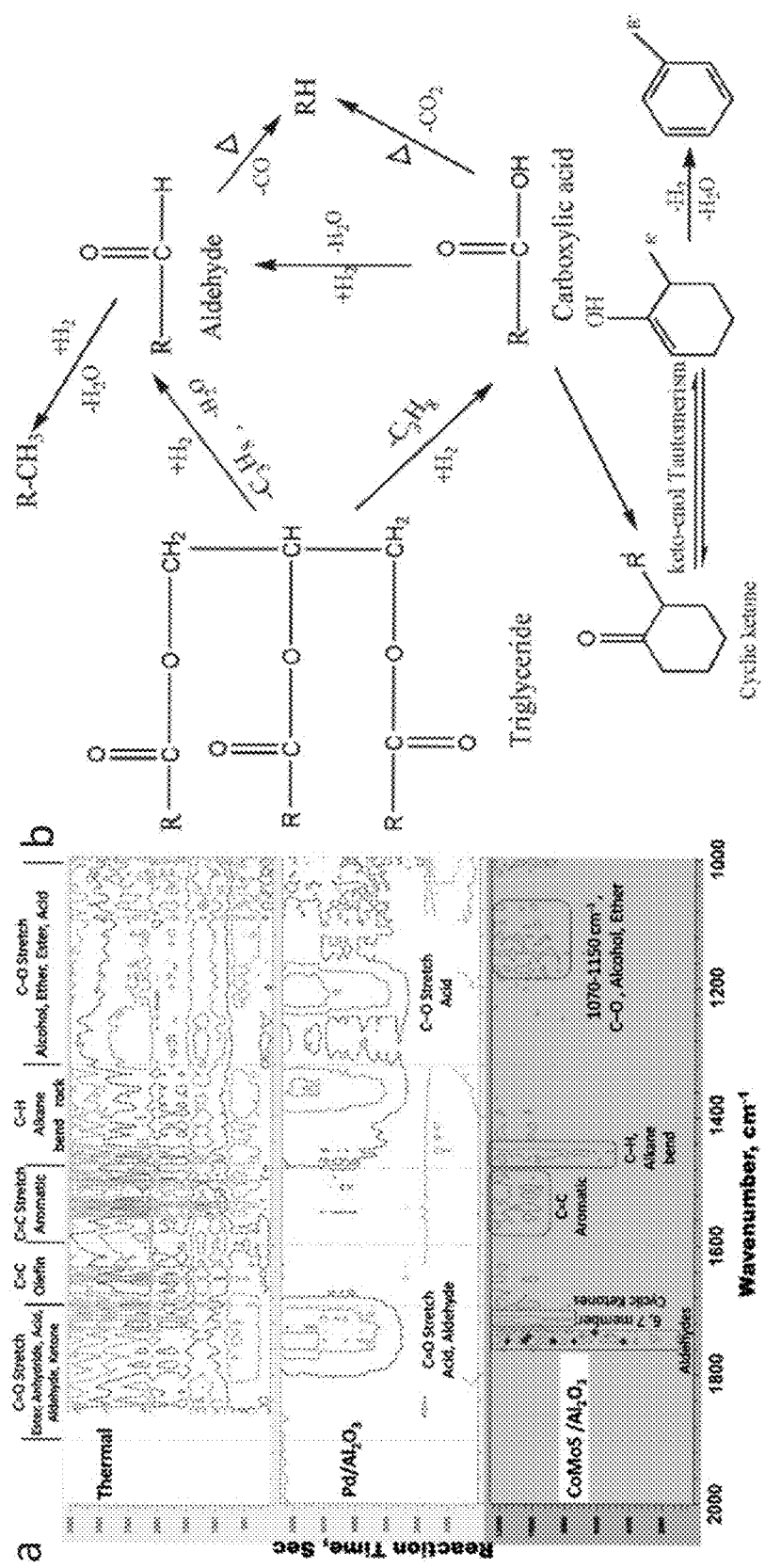
FIG. 1: FT-IR spectra with reaction time (a) and the plausible reaction mechanism (b) for the hydroprocessing and hydrogenation of triglycerides over different catalyst systems.

The following description of the preferred embodiment(s) is merely exemplary in nature and is in no way intended to limit the invention, its application, or uses.

The renewable feedstock/source i.e. lipids, glycerides and fatty acids from plant, animal or algae oil is mixed with hydrogen and processed over one or more metal sulfides or reduced form of metals of Group VI and/or Group IX and/or Group X elements, specifically the catalyst comprises of one or more active metal/nonmetals combinations such as Mo, W, Ni, Co, P, and Pt, Pd encapsulated inside Sodalite cages. The encapsulation of the Pt prevents poisoning from sulfur compounds. The renewable feedstock feed comprises any of the lipids/glyceride oils, soya oil, waste cooking oil, jatropha oil, karanj oil, algal oil, camelina oil, and waste animal fats. Our earlier disclosed invention, patent application 4093/DEL/2015 for development of such encapsulated catalytic systems; patent application numbers 3039/DEL/2012, WO 2014/049621, 3441/DEL/2012, 2622/DEL/2014, WO2016038633 which disclose formation of biofuels and aromatics are included in the present invention by reference. The above mentioned catalyst along with the active metals can also includes porous silica-alumina, zeolite, silica, alumina, silicoaluminophosphates or a combination of two or more thereof used as support for the active metals. The renewable source is processed over the afore mentioned catalyst under hydroprocessing conditions, i.e. specifically at low temperature, 250-500° C. than those for steam methane/naphtha reforming conditions (550° C. or above) to convert the renewable source into hydrogen, and hydrocarbons ranging between C1-C24 carbon number, comprising of n-paraffins, isoparaffins, cyclo paraffins, naphthenes, aromatics and polynuclear aromatics. The above mentioned feedstocks is converted catalytically using simultaneous combination of hydroconversion, reforming and water gas shift reactions at pressure from 10 to 150 atmosphere, average temperature of the catalytic bed from 250° C. to 500° C., space-velocity of from 0.5 $h^{-1}$ to 8 $h^{-1}$, and hydrogen to feed ratio of from 300 NL of hydrogen/L of feed to 3500 NL hydrogen/L of feed. The previous inventions as described earlier do not disclose the formation of hydrogen and material balances used for calculating the specific hydrogen consumption/generation in the process. The present invention discloses the hydrogen production and production rates in the process. The selectivity of the produced products may be achieved by suitably selecting the active metals, support and process conditions. The reactions occurring during the process are hydrocracking, dehydrogenation, dehydrocyclization, hydrodeoxygenation, hydrodesulfurization, hydrodenitrogenation, decarboxylation, decarbonylation, water gas shift, reforming, cyclization, aromatization and/or combination thereof. Renewable source is the oil originating from vegetable and animal fats, Vegetable and animal fats includes, but not limited to, waste restaurant oil, soyabean oil, jetropha oil, camelina oil, karanj oil, rice-bran oil and algae oil etc. The active metal(s) may be either in the reduced or sulfided form. Catalyst is reduced/sulfided in the reactor itself and the (re)sulfidation of the catalyst, during processing, helps in maintaining the desired activity for hydrogen production and also for maintaining the desired product patterns of hydrocarbons, specifically in terms of the amount of naphthenes, aromatics, paraffins and isoparaffins produced in the process. The hydrogen flow is kept constant at a specified rate and temperature of the bed is increased to 280° C. at a specified rate and keeps the bed this temperature under hydrogen flow for a specified period and then cool down the reactor to 50° C. The sulfidation of the reactor is also carried out in the reactor itself. The sulfidation is done by using the sulfur containing compound such as sulfides, disulfides and dimethyldisulfides. The catalyst bed is dried out by maintaining the nitrogen flow and increasing the bed temperature to 175° C. at a specified rate. The sulfiding agent mixed with straight run petroleum fraction is injected in the bed. Hydrogen flow is also maintained at specified rate. The temperature of the reactor bed is increased to the reaction temperature in a programmed way. After sulfidation, the sulfidation feed is replaced by actual renewable feed.

Figure 2:
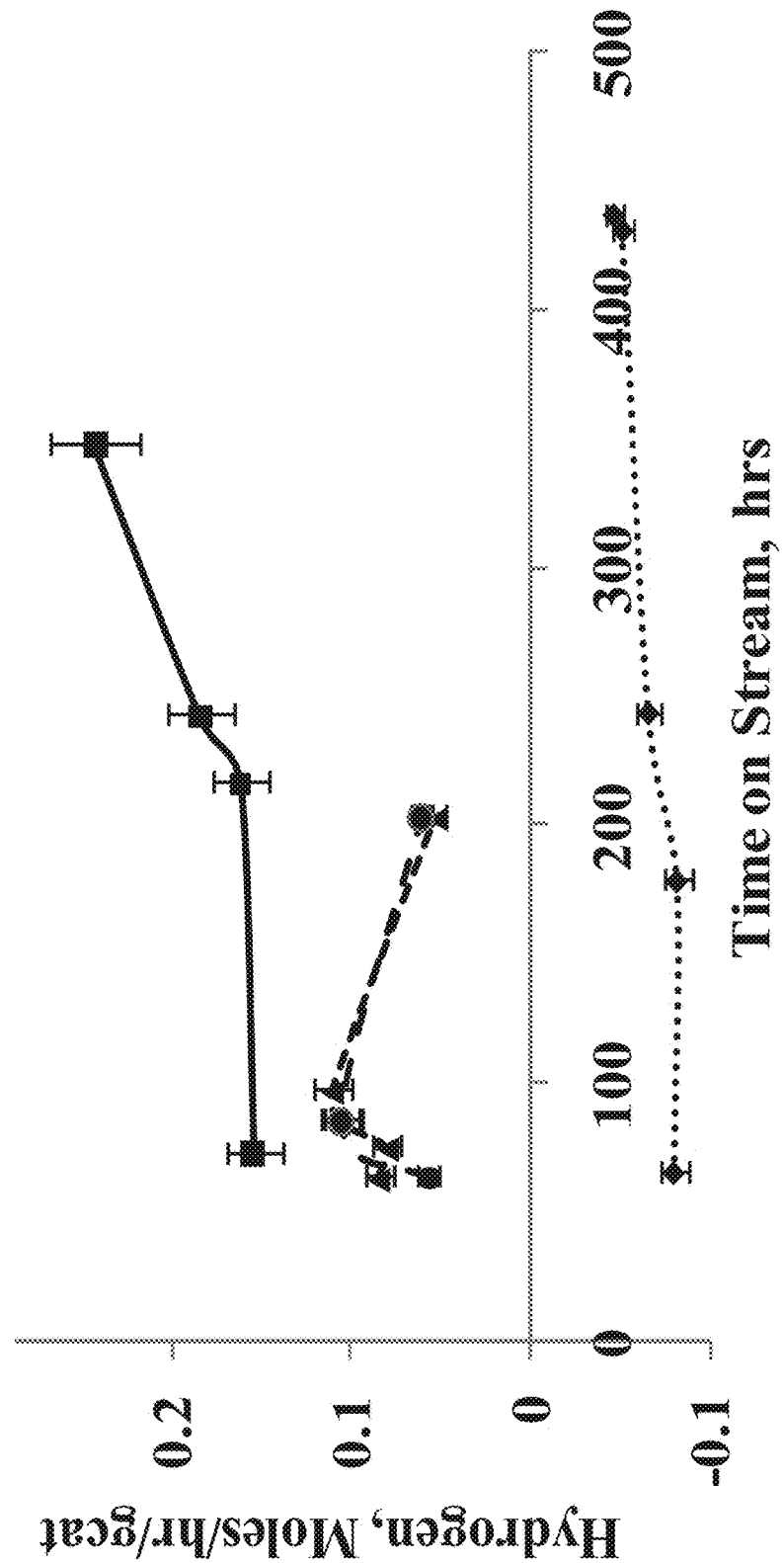
FIG. 2: Specific hydrogen gas balance for different catalyst systems as a function of time-on-stream (1.5 $hr^{-1}$, 350-460° C., 500-2500 NUL, 30-100 bar) (◆Conventional comparative example 1); ■Cat1 (ex. 1); ▲Cat2 (ex. 2); ●Cat3 (ex. 3).

The hydrogen consumed during the conversion of plant, animal or algae oil into hydrocarbons is balanced from the in-situ reactions such as reforming, dehydrogenation, water gas shift etc occurring during the same process. This production of hydrogen makes the entire process refinery independent and more economical and sustainable. The inventors believe that the multiple unsaturations (two or more double bonds such as in linoleic acid) in the feeds and the catalytic intermediates produced in the process from renewable feedstock (FIG. 1) drives the reaction towards cyclization and aromatization before the double bonds are saturated by hydrogen under favorable reaction conditions for the same. The same is confirmed with experiments with saturated triglycerides (coconut oil) wherein no aromatics or cycloalkanes are produced. Formation of polynuclear aromatics is unavoidable during the process which is unfortunately also the precursors for coke, leading to deactivation. An additional catalyst supported on small pore zeolites such as Pt/sodalite. Pd/sodalite was used in combination with the hydroprocessing catalyst to suppress the polynuclear aromatics formation. Hydrogen produced by renewable sources is utilized for their conversion into hydrocarbon and petrochemicals with no additional requirement of hydrogen gas as a reactant. FIG. 2 details the amount of hydrogen produced/consumed over different catalyst systems as a function of time on stream of the reactor. The hydrogen balance for conventional catalyst (Ni—Mo based. Hydroprocessing catalyst) and other novel catalytic systems as mentioned in example 1-6 clearly indicates formation of hydrogen (FIG. 2). This invention of catalyst and process makes the entire process for the conversion of lipids from various origins less dependent on refinery hydrogen for operation and can be setup at rural and agricultural areas's on a stand alone basis near the site of production of these renewable oils, with minimal initial requirement of hydrogen gas and minimal investment.

In one embodiment of this invention, renewable oil and/or natural fats containing lipids from various origins as mentioned earlier in detailed description is contacted with disclosed catalyst, but not limited to those mentioned earlier in the presence of hydrogen under hydroprocessing conditions, i.e. specifically at low temperature, 250-500° C. than those for steam methane/naphtha reforming conditions (550° C. or above) for the production of hydrogen gas and hydrocarbon compounds ranging between C1-C24 carbon number comprising of of n-paraffins, isoparaffins, cyclo paraffins, naphthenes, and aromatics and polynuclear aromatics. The renewable feedstocks is converted catalytically using simultaneous combination of hydroconversion, reforming and water gas shift reactions at pressure from 10 to 150 atmosphere, average temperature of the catalytic bed from 250° C. to 500° C., space-velocity of from 0.5 $h^{-1}$ to 8 $h^{-1}$, and hydrogen to feed ratio of from 300 NL of hydrogen/L of feed to 3500 NL hydrogen/L of feed. With the indication of catalyst deactivation in terms of appearance of unreacted glyceride as observed by GC, the catalyst is resulfided by putting 1000 ppm dimethyldisulfide in the vegetable oil. The products obtained with this resulfided catalyst have higher content of C17 as compared to C18. Also there were intermediate oxygenated compounds (Kubicka et al. (2009) and Huber et al. (2007) observed which were stable formed directly from vegetable oil. The NMR and IR analysis showed the presence of esters, alcohols, aldehydes, acids. Also the products had a high total acidity number (TAN) which showed the presence of acidic compounds (Anand et al., (2012), Bioresor. Technol.). These acidic intermediates were promoting the cracking, isomerization, aromatization reforming; water gas shift and dehydrocyclization reactions. The products were analyzed by gas-chromatography and also in-operando using FT-IR measurement setup.

Different catalysts such as $Pd/Al_2O_3$, Pd/C and sulfided $CoMo/Al_2O_3$ did not show ester formation, unlike in case of thermal conversion reactions (FIG. 1), when analysed using in-situ FT-IR measurements. Triglyceride hydrocracking follows propane removal pathway with high exothermicity was observed at the top of the catalyst bed and depropanation reactions were the most exothermic reactions and the heat of reaction for propane removal was similar to that for empirical heat of reaction (Anand et al., 2016 Appl. Catal. A: Gen. 516 144-152). The confirmation for the formation of anhydrides, acids, aldehydes as the primary reaction intermediates during the conversion of triglycerides (FIG. 1) further supported our earlier studies (Anand et al., 2016

Appl. Catal. A: Gen. 516 144-152) and the heat released by high exothermic reactions was utilized in-situ (WO2016038633) for conversion of the un-saturates and intermediates produced into cyclic and aromatic hydrocarbons, via water gas shift, reforming, cyclization, aromatization and/or combination of these reactions and in-turn lead to production of hydrogen (FIG. 1 and FIG. 2) along with other C1-C24 hydrocarbons at conditions lower than those for steam methane/naphtha reforming reactions which occur at 550° C. or above.

Based on the intermediates identified from the in-operando FT-IR studies, the most plausible mechanism for triglyceride conversion into hydrocarbons is proposed (FIG. 1b). The triglyceride conversion primarily leads to formation of aldehydes and acids along with simultaneous elimination of propane. The acids and aldehydes would further get hydrogenated to produce hydrocarbon. The acid may also undergo cyclization to produce cyclic ketones which would further undergo dehydrogenation-dehydration reactions to form more stable aromatics (as confirmed by IR bands for these compounds) (FIGS. 1a and b) along with hydrogen.

The feed is also doped with small quantities (1 ppm to 1%) of DMDS so as to prevent deactivation of the catalyst. The (re)sulfidation of the catalyst, during processing, helps in maintaining the desired activity for hydrogen production and also for maintaining the desired product patterns of hydrocarbons, specifically in terms of the amount of naphthenes, aromatics, paraffins and isoparaffins produced in the process.

EXAMPLES

Below, the present invention is further described in detail by working Examples, to which the present invention is not limited. The products were analyzed by gas-chromatography ASTM D6730 DHAX analysis. The concentration of aromatics, naphthenes, paraffins and isoparaffins was determined by 2D GCXGC-MS system from PAC, Agilent specifically designed for hydrocarbons ranging between C5-C25. Gas phase was analyzed by Agilent refinery gas analyser. Material balance was performed for the experiments. The difference between the total hydrogen inlet and the hydrogen in the outlet gas was used for quantitative measurements of hydrogen gas generated in each experiment, calculated as $$\frac{[mH_{in} - mH_{out}]}{m_{catalyst}},$$

where m=mass flow rate; $m_{catalyst}$ is mass of the catalyst loaded in the reactor.

Example 1

Glycerides were processed in a fixed bed reactor with sulfided 4% CoO-16% MoO$_3$-4% NiO/SiO$_2$—Al$_2$O$_3$. The reaction conditions for the experiments were: 420'C, 30 bar, 1.5 h$^{-1}$, and 2000 NL H$_2$ gas/NL liquid feed. A total of 8% Naphthenes, 3.3% mono aromatics and 12.5% polynuclear aromatics were observed, with 15% yield of naphtha, 40% yield of kerosene and 45% yield of diesel range hydrocarbons and the isomer to normal hydrocarbon ratio was found to be 1.5. In addition, 3.36 liters/hr/g$_{cat}$ of hydrogen was produced in the reactor. The amount of hydrogen produced due to formation of naphthenes and aromatics was calculated to be 0.09 liters/hr/g$_{cat}$ which was less as compared to total hydrogen produced, indicating occurrence of other side reactions such as reforming, water gas shift leading to production of hydrogen in-situ with other hydrocarbons, water, CO and CO$_2$.

Example 2

Glycerides were processed in a fixed bed reactor with sulfided graded bed catalyst system, i.e. first bed of 4% CoO-16% MoO$_3$-1% P$_2$O$_5$/Al$_2$O$_3$ and the second bed of 4% NiO-16% MoO$_3$/SiO$_2$—Al$_2$O$_3$. The reaction conditions for the experiments were: 460° C., 30 bar, 1.5 h-1, and 1500 NL H$_2$ gas/NL liquid feed. A total of 11% Naphthenes, 8.7% mono aromatics and 5.5% polynuclear aromatics were observed, with 15% yield of naphtha, 25% yield of kerosene and 60% yield of diesel range hydrocarbons and the isomer to normal hydrocarbon ratio was found to be 1.1. In addition, 2.3 liters/hr/g$_{cat}$ of hydrogen was produced in the reactor. The amount of hydrogen produced due to formation of naphthenes and aromatics was calculated to be 0.1 liters/hr/g$_{cat}$ which was less as compared to total hydrogen produced, indicating occurrence of other side reactions such as reforming, water gas shift leading to production of hydrogen in-situ with other hydrocarbons, water, CO and CO$_2$.

Example 3

Glycerides were processed in a fixed bed reactor with sulfided graded bed catalyst system, i.e. first bed of 4% CoO-16% MoO$_3$-1% P$_2$O$_5$/Al$_2$O$_3$ and the second bed of 0.75% Pt encapsulated inside a sodalite cage catalyst (Pt@SOD). The encapsulation of the Pt prevents poisoning from sulfur compounds. Our earlier disclosed invention patent application 4093/DEL/2015 for development of such encapsulated catalytic systems included in the present invention by reference. The reaction conditions for the experiments were: 460° C., 50 bar, 1.5 h$^{-1}$, and 1500 NL H$_2$ gas/NL liquid feed. A total of 16% Naphthenes, 11.3% mono aromatics and 3% polynuclear aromatics were observed, with 20% yield of naphtha, 30% yield of kerosene and 50% yield of diesel range hydrocarbons and the isomer to normal hydrocarbon ratio was found to be 0.8. In addition, 2.3 liters/hr/g$_{cat}$ of hydrogen was produced in the reactor. The amount of hydrogen produced due to formation of naphthenes and aromatics was calculated to be 0.11 liters/hr/g$_{cat}$ which was less as compared to total hydrogen produced, indicating occurrence of other side reactions such as reforming, water gas shift leading to production of hydrogen in-situ with other hydrocarbons, water, CO and CO$_2$.

Example 4

Glycerides were processed in a fixed bed reactor with sulfided graded bed catalyst system, i.e. first bed of 4% CoO-16% MoO$_3$-1% P$_2$O$_5$/Al$_2$O$_3$ and the second bed of 0.75% Pd encapsulated inside a sodalite cage catalyst (Pd@SOD). The reaction conditions for the experiments were: 440° C., 40 bar, 1.5 h$^{-1}$, and 1500 NL H$_2$ gas/NL liquid feed. A total of 25% Naphthenes, 6% mono aromatics and 1.6% polynuclear aromatics were observed, with 15% yield of naphtha, 25% yield of kerosene and 60% yield of diesel range hydrocarbons and the isomer to normal hydrocarbon ratio was found to be 0.8. In addition, 1.5 liters/hr/g$_{cat}$ of hydrogen was produced in the reactor. The amount of hydrogen produced due to formation of naphthenes and aromatics was calculated to be 0.08 liters/hr/$g_{cat}$ which was less as compared to total hydrogen produced, indicating occurrence of other side reactions such as reforming, water gas shift leading to production of hydrogen in-situ with other hydrocarbons, water, CO and $CO_2$.

Example 5

Glycerides were processed in a fixed bed reactor with sulfided 4% CoO-16% $MoO_3$-4% $NiO/SiO_2$—$Al_2O_3$. The reaction conditions for the experiments were: 380° C., 50 bar, 1.5 $h^{-1}$, and 2000 NL $H_2$ gas/NL liquid feed. A total of 9% Naphthenes, 7% mono aromatics and 7.3% polynuclear aromatics were observed, with 5% yield of naphtha, 10% yield of kerosene and 85% yield of diesel range hydrocarbons and the isomer to normal hydrocarbon ratio was found to be 2. In addition, 2 liters/hr/$g_{cat}$ of hydrogen was produced in the reactor. The amount of hydrogen produced due to formation of naphthenes and aromatics was calculated to be 0.14 liters/hr/$g_{cat}$ which was less as compared to total hydrogen produced, indicating occurrence of other side reactions such as reforming, water gas shift leading to production of hydrogen in-situ with other hydrocarbons, water, CO and $CO_2$.

Example 6

Glycerides were processed in a fixed bed reactor with sulfided 4% CoO-16% $WO_3$-4% $NiO/SiO_2$—$Al_2O_3$. The reaction conditions for the experiments were: 380° C. 50 bar, 1.5 h-1, and 2500 NL $H_2$ gas/NL liquid feed. A total of 8% Naphthenes, 6% mono aromatics and 7.3% polynuclear aromatics were observed, with 5% yield of naphtha, 15% yield of kerosene and 80% yield of diesel range hydrocarbons and the isomer to normal hydrocarbon ratio was found to be 2.5. In addition, 1.7 liters/hr/$g_{cat}$ of hydrogen was produced in the reactor. The amount of hydrogen produced due to formation of naphthenes and aromatics was calculated to be 0.12 liters/hr/$g_{cat}$ which was less as compared to total hydrogen produced, indicating occurrence of other side reactions such as reforming, water gas shift leading to production of hydrogen in-situ with other hydrocarbons, water, CO and $CO_2$.

Comparative Example 1

Glycerides were processed in a fixed bed reactor with sulfided 16% $MoO_3$-4% $NiO/SiO_2$—$Al_2O_3$. The reaction conditions for the experiments were: 380-400° C., 50-100 bar, 1.5 $h^{-1}$, and 2000-2500 NL $H_2$ gas/NL liquid feed. A maximum of 2% Naphthenes, 1% mono aromatics were observed, with 5% yield of naphtha, 10% yield of kerosene and 85% yield of diesel range hydrocarbons and the isomer to normal hydrocarbon ratio was found to be 1.5. In addition, 1.6 liters/hr/$g_{cat}$ of hydrogen was consumed in the process. No hydrogen was produced in the overall process. Although there may be some amount of hydrogen produced due to formation of naphthenes and aromatics, (which was calculated to be only 4.4 milliliters/hr/$g_{cat}$, indicating negligible amount of hydrogen produced), and hence hydrogen was being consumed during the process.

Advantages

The present invention relates to development of a low cost, low temperature and single reactor catalytic process for the production of hydrogen and hydrocarbon fuels from renewable source such as oils originating from plant, animal fats or algae sources. The hydrogen consumed during the conversion of plant, animal or algae oil into hydrocarbons is balanced from the in-situ reactions such as reforming, dehydrogenation, water gas shift etc occurring during the same process. This production of hydrogen makes the entire process refinery independent and more economical and sustainable. Hydrogen produced by renewable sources is utilized for their conversion into hydrocarbon and petrochemicals with no additional requirement of hydrogen gas as a reactant. This invention of catalyst and process makes the entire process for the conversion of lipids from various origins less dependent on refinery hydrogen for operation and can be setup at rural and agricultural areas on a stand alone basis near the site of production of these renewable oils, with minimal initial requirement of hydrogen gas and minimal investment. The above mentioned feedstocks is converted catalytically using simultaneous combination of hydroconversion, reforming and water gas shift reactions at pressure from 10 to 150 atmosphere, average temperature of the catalytic bed from 250° C. to 500° C., space-velocity of from 0.5 $h^{-1}$ to 8 $h^{-1}$, and hydrogen to feed ratio of from 300 NL of hydrogen/L of feed to 3500 NL hydrogen/L of feed. The intermediates identified from the in-situ FT-IR studies indicated towards the most plausible mechanism for glyceride conversion into hydrocarbons, and hydrogen gas. The glyceride hydro-conversion primarily leads to formation of aldehydes and acids along with simultaneous elimination of propane. The acids and aldehydes would further get hydrogenated to produce hydrocarbon. The acid may also undergo cyclization to produce cyclic ketones which would further undergo dehydrogenation-dehydration reactions to form more stable aromatics (as confirmed by IR bands for these compounds) (FIGS. 1a and b) along with hydrogen.

What is claimed is:

1. A catalytic process for obtaining hydrogen gas and hydrocarbons ranging from C1-C24 in a single reactor, the process comprising:
    a) mixing a renewable feedstock selected from the group consisting of plant, animal or algae oil, lipids, glycerides and fatty acids with hydrogen in a range of 300 to 3500 NL hydrogen/L of feed;
    b) processing of renewable feedstocks obtained in step (a) in a single or multiple sulfided graded catalytic beds with single or multiple catalytic materials comprising of one or more active metal combinations or metal encapsulated inside sodalite cages or a combination thereof, at an average temperature of the catalytic bed from 250° C. to 500° C., at a pressure in the range of 10 to 150 atmosphere, at a space-velocity in the range of 0.5 $h^{-1}$ to 8 $h^{-1}$,
    wherein the active metal combinations comprise the combination of metals selected from the group consisting of Mo, Ni, Co, and W, and wherein the metal encapsulated inside sodalite cage catalyst is selected from Pt or Pd.

2. The process as claimed in claim 1, wherein the processing of renewable feedstock comprises simultaneously occurring hydrocracking, dehydrogenation, dehydrocyclization, hydrodeoxygenation, hydrodesulfurization, hydrodenitrogenation, decarboxylation, decarbonylation, water gas shift, reforming, cyclization, aromatization and/or combination of these reactions.

3. The process according to claim 1, wherein the catalytic material further includes porous silica-alumina, zeolite, silica, alumina, silicoaluminophosphates or a combination thereof used as support.

4. The process according to claim 1, wherein the reaction is additionally performed in the presence of noble metals Pt, Pd encapsulated inside small pore zeolites such as sodalite.

5. The process according to claim 1, wherein the renewable feedstock is lipids/glyceride oils.

6. The process according to claim 1, wherein hydrocarbons ranging from C1-C24 comprises paraffins, naphthens and aromatics.

7. The process according to claim 1, wherein the feedstock selected from plant comprises soya oil, waste cooking oil, jatropha oil, karanj oil, camelina oil and feedstock selected from animal is waste animal fats.

\* \* \* \* \*